US008008586B2

(12) United States Patent
Kuehl et al.

(10) Patent No.: US 8,008,586 B2

(45) Date of Patent: Aug. 30, 2011

(54) MECHANICALLY ENERGIZED MECHANICAL POWER COMMUNICATION COUPLING SYSTEM

(75) Inventors: Steven J. Kuehl, Stevensville, MI (US); Richard A. McCoy, Stevensville, MI (US)

(73) Assignee: Whirpool Corporation, Benton Harbor, MI (US)

( * ) Notice: Subject to any disclaimer, the term of this patent is extended or adjusted under 35 U.S.C. 154(b) by 67 days.

(21) Appl. No.: 12/643,226

(22) Filed: Dec. 21, 2009

(65) Prior Publication Data

US 2011/0147159 A1 Jun. 23, 2011

(51) Int. Cl.
*H04Q 1/00* (2006.01)

(52) U.S. Cl. ................. 200/51 R; 200/61.62; 200/61.81

(58) Field of Classification Search ................ 200/51 R, 200/51.09, 61.62, 61.7, 61.71, 61.73, 61.74, 200/61.76, 61, 81
See application file for complete search history.

(56) References Cited

U.S. PATENT DOCUMENTS 3,101,984 A 8/1963 Wieckmann
4,148,536 A 4/1979 Petropoulsos et al.
4,591,732 A 5/1986 Neuenschwander
5,385,468 A 1/1995 Verderber
5,433,623 A 7/1995 Wakata et al.
5,713,752 A 2/1998 Leong et al.
6,176,718 B1 1/2001 Skarie et al.
6,428,334 B1 8/2002 Skarie et al.
7,024,717 B2 4/2006 Hilscher et al.
7,207,080 B2 4/2007 Hilscher et al.
7,354,292 B1 4/2008 Lloyd et al.
2004/0154318 A1 8/2004 Roh et al.
2006/0168236 A1 7/2006 Higuma et al.
2008/0165476 A1 7/2008 McCoy et al.
2008/0231464 A1* 9/2008 Lewis et al. .................. 340/825
2009/0054804 A1* 2/2009 Gharib et al. ................ 600/554
2011/0049308 A1* 3/2011 Beaman et al. .............. 246/258

FOREIGN PATENT DOCUMENTS

EP 0868077 A2 9/1998
JP 60033716 A 2/1985
JP 06310202 A 11/1994
JP 06310204 A 11/1994
JP 06333633 A 12/1994
JP 2007080584 A 3/2007
WO 2007/015274 A1 2/2007

* cited by examiner

*Primary Examiner* — Gary F. Paumen

(74) *Attorney, Agent, or Firm* — Robert A. Bacon; McGarry Bair PC

(57) ABSTRACT

A mechanical power coupling system including a mechanical power connector component for communicating a mechanical power service with another mechanical power connector component. A mechanical power service switch is provided for selectively permitting communication of the mechanical power service between the mechanical power connector components. The mechanical power service switch is activated to transfer a mechanical power service from a mechanical power service source to a mechanical power service consumer in response to a proximity sensor engaging a proximity target.

48 Claims, 7 Drawing Sheets

MECHANICALLY ENERGIZED MECHANICAL POWER COMMUNICATION COUPLING SYSTEM

BACKGROUND

Appliances and other useful household equipment are increasingly designed to interact with one another, as well as with a variety of accessory devices. An accessory device may be used, for example, in conjunction with an appliance to enhance or supplement the functionality of the appliance.

BRIEF SUMMARY

The invention relates to couplers and coupling systems for connecting accessory devices to hosts.

According to one aspect of the invention, a system for receiving a mechanical power service consumer comprises a mechanical power coupling system. The coupling system comprises a first mechanical power service connector component capable of being operably associated with the mechanical power service consumer, a contact proximity target associated with at least one of the first mechanical power service connector and the mechanical power service consumer, a second mechanical power service connector component operably engageable with the first mechanical power service connector component, the second mechanical power service connector component being capable of being operably associated with a mechanical power service source, a mechanical power service switch operably associated with the second mechanical power service connector component, the mechanical power service switch selectively permitting the communication of the mechanical power service from the mechanical power service source to the first mechanical power service connector component, and a contact proximity sensor operably associated with the mechanical power service switch, the contact proximity sensor engageable with the contact proximity target when the first mechanical power service connector component is engaged with the second mechanical power service connector component, wherein the mechanical power service switch is operable to permit communication of the mechanical power service to the first mechanical power service connector component in response to the contact proximity sensor engaging the contact proximity target.

According to another aspect of the invention, a mechanical power coupling system connects a portable device to a host. The mechanical power coupling system comprises a mechanical power service connector component capable of communicating a mechanical power service, a mechanical power service switch operably connected to the mechanical power service connector component for selectively permitting the mechanical power service to be transmitted to the mechanical power service connector component, and a contact proximity sensor operably connected to the mechanical power service switch and engageable with a contact proximity target, wherein the mechanical power service switch is configured to allow the mechanical power service to be transmitted to the mechanical power service connector component when the contact proximity sensor engages the contact proximity target.

According to yet another aspect of the invention, a system is provided for use in association with a host having a mechanical power service provider, a first mechanical power service connector component, and a mechanical power service switch selectively providing a mechanical power service to the first mechanical power service connector component in response to a contact proximity sensor engaging a contact proximity target, and in association with an accessory device having a mechanical power service consumer. The system comprises a second mechanical power service connector component engageable with the first mechanical power service connector component, a mechanical power service pathway interconnecting the mechanical power service consumer and the second mechanical power service connector component, and a contact proximity target capable of engaging the contact proximity sensor to activate the mechanical power service switch.

According to still another aspect of the invention, an adapter removably couples a portable device having a first device mechanical power service connector component to a host having a mechanical power service provider, a first host mechanical power service connector component that cannot be directly connected to the first device mechanical power service connector component, and a mechanical power service switch selectively providing a mechanical power service to the first host mechanical power service connector component in response to a contact proximity sensor engaging a contact proximity target. The adapter comprises a second host mechanical power service connector component engageable with the first host mechanical power service connector component, a second device mechanical power service connector component engageable with the first device mechanical power service connector component, a mechanical power service pathway interconnecting the second host mechanical power service connector component and the second device mechanical power service connector component for the transfer of a mechanical power service therealong, and a contact proximity target capable of engaging the contact proximity sensor to actuate the mechanical power service switch.

According to still another aspect of the invention, a mechanical power communication device communicates with an appliance performing a useful cycle of operation on an article and having a housing, a cavity in the housing, the cavity having an first mechanical power service connector component; a proximity coupling system component associated with the first mechanical power service connector component. The mechanical power service communicating device comprises a second mechanical power service connector component capable of connecting with the first mechanical power service connector component for the communication of mechanical power service therebetween, and a second proximity coupling system component associated with the second mechanical power service connector component, capable of communicating with the first proximity coupling system component within a proximity coupling system to selectively control the communication of mechanical power service between the first and second mechanical power service connectors in response to the interaction of the proximity coupling devices providing an indication that the first and second mechanical power service connectors are coupled.

DETAILED DESCRIPTION

Figure 1:
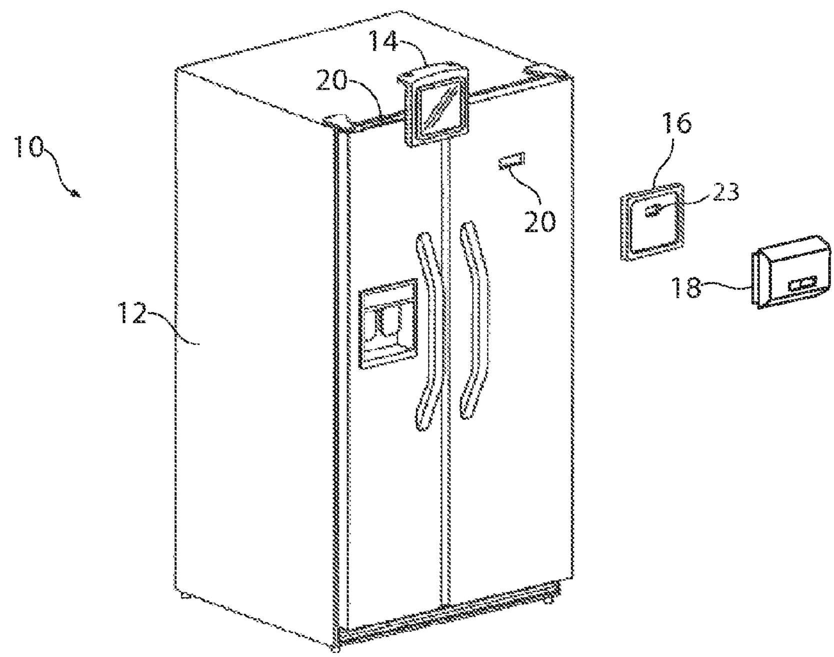
FIG. 1 is a perspective view of a modular system according to a first embodiment of the invention employing a mechanically energized mechanical power coupling system for connecting an accessory device to a host.

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present invention. Further, the descriptions set forth herein are not intended to be exhaustive or to otherwise limit or restrict the claims to the precise forms and configurations shown in the drawings and disclosed in the following detailed description.

The drawings and the below detailed description relate generally to systems of mechanical power coupling systems for coupling a mechanical power service provider with a mechanical power service consumer. The following definitions apply to terms that may be used in the specification and the claims, unless otherwise noted.

As used herein, a "mechanical power service" is mechanical power or mechanical movement that may be communicated from one device to another.

As used herein, "mechanical power communication" is a useful provision of a mechanical power service from one device to another device. Communicating a mechanical power service means supplying or receiving a mechanical power service. As used herein, communication of mechanical power service includes both uni-directional and multi-directional communication between any two devices, either directly or through an adapter, as defined herein. For example, mechanical power communication accomplished through interengaging gears, wheels, plates, levers, or chains.

The terms "provide" and "supply" and any variation thereof, are used herein to denote a source of the mechanical power service relative to a device receiving the mechanical power service. Neither term is limited to the original source of the mechanical power service. A device that provides or supplies the mechanical power service may simply be passing on the mechanical power service from the original source. For example, a device that provides power from a rotating wheel or gear may pass on to another device power in the form of a translating belt.

The term "receive" and any variation thereof, is used herein to denote a receipt of the mechanical power service relative to the device providing the mechanical power service. The term is not limited to the ultimate consumer of the mechanical power service. A device that receives the mechanical power service may simply be passing on the mechanical power service from the source, such as transmission, to a device that will consume, as hereinafter defined, the mechanical power service. The device which receives a mechanical power service is not necessarily the end consumer of the mechanical power service.

The term "consume" and any variation thereof, as used herein, denotes the act of employing, using, storing, or dispensing at least a portion of the mechanical power service received in connection with performing a function.

The term "coupled" and any variation thereof, as used herein, includes any type of connection that permits transfer of a mechanical power service between two devices. The term "coupled" includes both fixed and removable coupling, as well as both continuous and intermittent coupling.

The term "useful device" and any variation thereof, as used herein, is a device that is capable of performing a useful physical or virtual function either alone or in combination with another device.

The term "mechanical power service consumer" and any variation thereof, as used herein, is any useful device that employs, uses, stores, or dispenses a mechanical power service in connection with performing a physical or virtual function. A mechanical power service consumer may be, for example, a smart utensil, an appliance, a resource controller, a dispenser, a detergent dispenser, a drink dispenser, a mixer, a fan, a blender, a cycle accessory, a water dispenser, a motor, a tissue dispenser, a can opener, an ice dispenser, an ice maker, an ice shaver, an ice crusher, an ice cream maker, a coffee maker, a coffee grinder, a drink mixer and stirrer, a slush maker, a milk shake maker, a juice squeezer, a food processor, an agitator, a food spit, and a food stirrer.

The term "mechanical power service provider" and any variation thereof, as used herein, is any device that is capable of supplying a mechanical power service to another device.

A "mechanical power service communicating device" is any mechanical power service provider or mechanical power service consumer or any other device that is capable of communicating a mechanical power service with another device.

As used herein, the term "host" is an apparatus that has a primary function independent of providing a mechanical power service. A host may be a mechanical power service provider, a mechanical power service consumer, or both. For example, the host may be an appliance and the primary function can be performing a series of steps to conduct a useful cycle of operation. The appliance may be a conventional household appliance, such as a refrigerator performing a cooling cycle or an ice making cycle. Other examples of appliances that may be hosts include, but are not limited to, a freezer, a conventional oven, a microwave oven, a dishwashing machine, a stove, a range, an air conditioner, a dehumidifier, a clothes washing machine, a clothes dryer, a clothes refreshing machine, and a non-aqueous washing apparatus, or any combination thereof. Alternatively, the host may be a fixture such as a water softener, a water heater, a furnace, pool water treatment equipment, or an HVAC system. The host may be a small device such as a blender, a mixer, a trash compactor, a vacuum cleaner, or a robot. A host can alternatively comprise a structural feature of a building, such as a wall, cabinet, or door. The host may also provide other services, such as electrical power, electronic data, substance handling, illumination, heat, or sound.

Appliances generally perform the cycle of operation on an article. Examples include clothes washing machines that clean articles such as fabrics, and ovens that cook articles such as food. Generally, the article is placed in the cavity of the appliance for the execution of the cycle of operation. Cavities which receive the article may include a mechanical power service connector component for use with a mechanical power service consumer such as an accessory. In some cases, the accessory could be used in cooperation with the cycle of operation. In other cases, the accessory could take advantage of conditions within the cavity to perform other functions or other cycles of operations.

As used herein, the terms "accessory" or an "accessory device" refer to any useful device which may be coupled to a host and communicate a substance to or from the host. An accessory device may be used primarily in conjunction with a host to enhance, supplement, regulate, or monitor the functionality of the host or may have independent functionality and utility. An accessory device may be a substance provider, a substance consumer, or both. Examples of an accessory device include, but are not limited to, a paper product dispenser, a dry goods dispenser, a bottle opener, a liquid dispenser, a pill dispenser, a water dispenser, a fan, a motor, a tissue dispenser, a can opener, a mixer, a blender, an ice dispenser, an ice maker, an ice cream maker, a coffee maker, a soap dispenser, and a softener dispenser.

As used herein, the term "portable device" is an accessory device that is designed to be moveable by a user during its useful life between a use location and a storage location or alternative use location.

As used herein, the term "independent device" is a useful device that provides a useful function without being connected to a mechanical power service provider. In some cases, the primary function of the independent device is different from the primary function of a host from which the independent device may receive a mechanical power service. The independent device may be an accessory device.

As used herein, the term "dependent device" is a useful device that provides a useful function only when connected to a mechanical power service provider. A dependent device may be a mechanical power service consumer. Examples of a dependent device that may be coupled to a host include, but are not limited to, a smart pan or pot, an icemaker, and a bulk detergent dispenser.

A "service connector system" as used herein is a connector system having at least two separate service connector components, each of which is associated with a useful device. The service connector components cooperate with one another to couple the useful devices to facilitate communication of a service between the useful devices. A service connector system may carry multiple services. An electromagnetic service connector system, for example, may be associated with or incorporated into a mechanical power service connector system or may be independent of a mechanical power service connector system but be associated with the same mechanical power service provider or mechanical power service consumer.

As used herein, the term "mechanical power coupling system" is a service connector system having at least two separate mechanical power service connector components, each associated with a useful device. The mechanical power service connector components cooperate with one another to couple the useful devices to facilitate communication of a mechanical power service between the useful devices. A "mechanical power service connector component" may alternately be referred to as simply a "mechanical power connector component".

As used herein, the term "switched mechanical power coupling system" is a mechanical power coupling system having switching capability in at least one of the mechanical power service connector components operable to selectively control the communication of a mechanical power service between the components of the mechanical power coupling system.

As used herein, the term "mechanical power service switch" is any component used to selectively regulate the communication of a mechanical power service between components of a mechanical power service coupling system, any may comprise, but it not limited to, a switch, a motor, a fan or a controller for controlling such devices. A mechanical power service switch may be associated with switching more than one type of service. For example, a mechanical power service switch may be associated with, integrated with, or comprise an electromagnetic service switch.

"Wireless" refers to a type of communication in which power and/or data is transferred over a distance without the use of electrical conductors or wires. For example, electromagnetic waves, light waves, or acoustic waves can be used to carry power and/or data over a distance without using electrical conductors or wires.

A "proximity target" as used herein is any component or device that may be detected when positioned within range of an associated proximity sensor, defined below. A proximity target may be passive, such as a visual target or a magnetic target formed of magnetic or magnetic responsive material. Other examples of passive proximity targets may include a conductive component or surface capable of cooperating with a magnetic field, a current, or a voltage provided by a proximity sensor. A proximity target may alternatively be active or powered such as an electromagnet, a generator of a magnetic field, a current, a voltage or an acoustic wave. An active proximity target may alternatively provide a powered readable display or dispense a detectable chemical.

A "proximity sensor" as used herein is any component or device that may detect an associated proximity target when the proximity target is within arrange of the proximity sensor. A proximity sensor may detect, for example, a change in an electromagnetic field, an electromagnetic wave, an acoustic wave, a visual target a chemical component, an electrical signal, a change in voltage, a change in current, a change in frequency, a change in resistance, a change in inductance, a change in capacitance, a mechanical signal, a change in pressure, a displacement, a vibration, and the presence of a chemical. A proximity sensor may be active or passive, such as a magnetic sensor of magnetic or magnet responsive material, or may alternatively be active. Examples of active sensors include active magnetic sensors, light sensors, optical sensors, acoustic sensors, electromagnetic sensors, chemical sensors and thermal sensors. Examples of magnetic sensors include magnets and magnetic responsive components. Examples of optical sensors include infrared sensors, photoelectric sensors, fiber optic sensors, photo resistors, photovoltaic sensors, photo diodes and cameras. Examples of electromagnetic sensors include radio receivers, radar sensors, Hall Effect sensors, inductive sensors, capacitive sensors, variable reluctance sensors and eddy current sensors. Examples of acoustic sensors include ultrasonic sensors and microphones. A "contact proximity sensor" detects a proximity target by touching the proximity target. A "contactless proximity sensor" detects the target through a wireless or contactless means. For example, magnetic flux can be used as the signaling mechanism between a contactless proximity sensor and a contactless proximity target.

As used herein, the term "proximity system" is a system that uses a "proximity switch" operated by a plurality of "proximity coupling components," each associated with a different parent device, for determining that the parent devices are in proximity with each other. Parent devices are usually paired, examples of which include a service provide and a service consumer, a host and an accessory device, and a host and an adapter. Proximity coupling components may include a proximity target associated with one parent device to actively or passively provide an indication of the presence of the one parent device and a proximity sensor associated with the other parent device responsive to the presence of the proximity target to activate the proximity switch. The proximity switch may be used to provide a signal or message indicative of the proximity of two parent devices or may directly or indirectly regulate the communication of a service along a service pathway. The systems disclosed herein employ contact proximity systems, wherein the proximity target and proximity switch use physical contact to detect the proximity of the two parent devices.

As used herein, the term "plug" is a generally male mechanical power service connection component.

As used herein, the term "receptacle" is a generally female mechanical power service connection component.

As used herein, the term "mechanical power service pathway" refers to a pathway for transferring a mechanical power service from one location to another. The mechanical power service pathway may have any of a variety of configurations depending on the type of mechanical power service being transferred, including but not limited to a shaft, a cable, a chain, or a belt.

As used herein, the term "adapter" is an intermediate device that may be provided between a first and second useful device, such as between a host and an accessory, to facilitate the communication of mechanical power services between the first and second useful devices. An adapter may receive a mechanical power service from the first useful device and provide the mechanical power service or a modified version of the mechanical power service to the second useful device, for example, by modifying the rotational speed at which mechanical power is delivered or by changing rotational motion into translational motion. In some applications, multiple adapters may be interposed between two useful devices. In other applications, three or more useful devices may be coupled to a single adapter, such as multiple accessories for a host. In some applications, the adapter may itself be a useful device providing a useful function not provided by the other useful device or devices coupled to it. An adapter may optionally include a transformative component that transforms a service from a service provider to a different service, which is supplied to a service consumer. This may be useful when the service from the service provider is not compatible with the service consumer. The transformative component can be configured to transform the service into a compatible form for the service consumer. Examples of transformative components are protocol converters, power transformers, or other devices that convert substance, energy, or data from a first form to a second form.

As used herein, the term "functional unit" is the combination of any adapter coupled to an accessory, which together provide a functionality that neither the adapter nor the accessory can alone provide. Any functional unit itself is also included within the meaning of the term "useful device".

Figure 2:
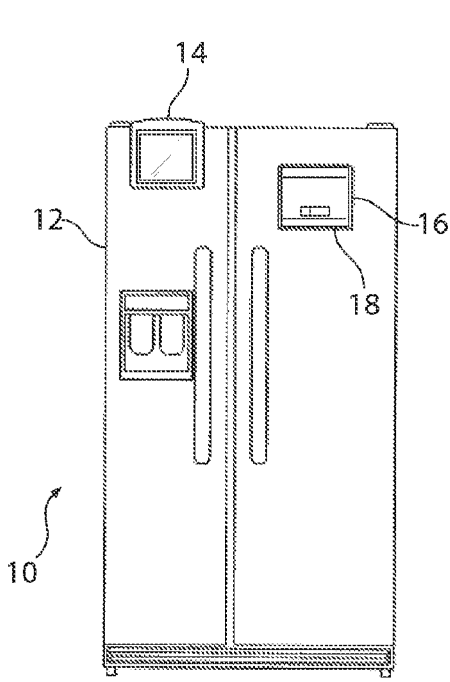
FIG. 2 is a front elevational view of the modular system of FIG. 1 showing the accessory device attached to the host.
Figure 3:
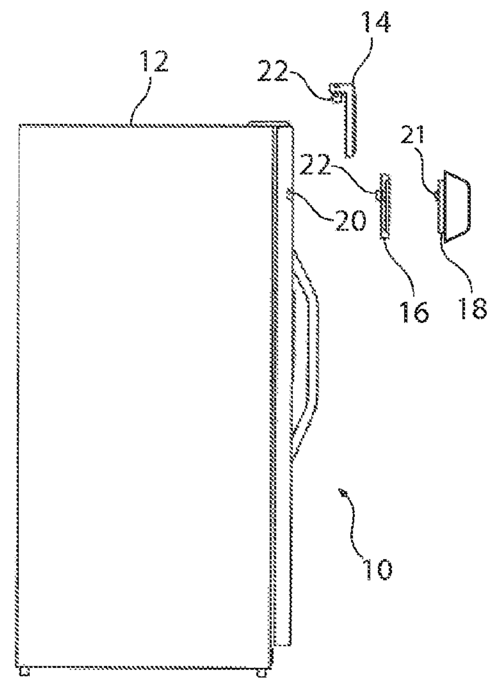
FIG. 3 is a side elevational view of the modular system of FIG. 1 showing the accessory device removed from the host.

Referring now to FIGS. 1 through 3, a schematic illustration of a modular system 10 according to a first embodiment of the invention is shown to include at least one host 12 and at least one accessory device 14 that can be coupled to host 12. The host 12 may be a mechanical power service provider, and the accessory device 14 can be a mechanical power service consumer.

Accessory device 14 may be either directly or indirectly coupled to host 12. Direct coupling occurs when accessory device 14 includes a mechanical power service connector component suitably configured for engaging a corresponding mechanical power service connector component of host 12 to establish a mechanical power service pathway between the host and the accessory device. The mechanical power service pathway provides a service pathway for transferring at least one mechanical power service from host 12 to accessory device 14 and from accessory device 14 to host 12.

An adapter 16 provided for coupling an accessory device 18 having an incompatible mechanical power service connector component to host 12. A mechanical power service connector component is incompatible if it cannot be directly coupled to a corresponding mechanical power service connector component, such as when the incompatible mechanical power service connector component lacks certain physical features that would enable the mechanical power service connector component to engage the corresponding connector to establish a mechanical power service pathway. Adapter 16 may include a mechanical power service connector component that can be directly coupled with the mechanical power service connector component of host 12 and a second mechanical power service connector component that can be directly coupled with the incompatible mechanical power service connector component of accessory device 18, thereby establishing a mechanical power service pathway between host 12 and accessory device 18. Like the accessory device 14, the adapter 16 can be a mechanical power service consumer.

Although accessory device 14 is shown coupled to an upper surface of host 12, whereas accessory device 18 is shown attached to a front surface of host 12 by way of adapter 16, it shall be appreciated that in practice, accessory device 14 may be suitably configured for coupling to host 12 in any desired location and manner in order to accommodate the design and performance requirements of a particular application, such as on any surface on the exterior or interior an appliance.

Host 12 may perform a primary function. As illustrated herein, host 12 is a refrigerator performing a cooling cycle and/or an ice making cycle. Although the figures show an appliance comprising a refrigerator, it shall be understood that the invention is not limited to refrigerators or appliances in general.

Accessory device 14 and accessory device 18 may also perform at least one primary function. The primary functions of accessory device 14 and accessory device 18 can be different from the primary function performed by host 12, although they need not be.

Host 12 can be configured to communicate at least one mechanical power service to or from accessory device 14 and accessory device 18. Similarly, devices 14 and 18 may also be configured to communicate at least one mechanical power service to or from host 12. It is not necessary that the mechanical power service transferred between host 12 and devices 14 and 18 be used in performing the primary function of host 12 or devices 14 and 18, or otherwise be related to the primary function of either accessory device.

As mentioned previously, in instances where the accessory device includes an incompatible mechanical power service connector component that prevents direct coupling of the accessory device to host 12, adapter 16 may be provided for indirectly coupling the accessory device to host 12. Adapter 16 operates to establish a mechanical power service pathway for transferring the desired mechanical power service between host 12 and accessory device 18 having the incompatible mechanical power service connector component.

At least one mechanical power service can be supplied to accessory devices 14 and 18 from host 12, or from accessory devices 14 and 18 to host 12. The supply of the mechanical power service can be uni-directional in that either host 12 supplies the mechanical power service to accessory devices 14 and 18 or accessory devices 14 and 18 supply the mechanical power service to host 12. The supply of the mechanical power service can also be bi-directional in that the supplied mechanical power service can be delivered from host 12 to accessory devices 14 and 18 and from accessory devices 14 and 18 to host 12.

Mechanical power services that can be transferred between host 12 and devices 14 and 18 may include any mechanical power or motion, such as rotary motion and translational motion. Host 12 may be operating as a mechanical service pathway for transferring a mechanical power service received from an outside source. It shall be appreciated that these are only examples of the various types of mechanical power services that can be transferred between host 12 and devices 14 and 18.

As illustrated, the accessory device 18 is a medicine module. This module may provide convenient access and consumer visibility to a supply of medicine for a consumer and allow controlled dispensing or controlled access to the contents. Additionally, the medicine module may also control temperature and humidity independently of the host 12 by the use of a fan or compressor system powered by the mechanical power service. It will be appreciated that the medicine module may also include a suitable coupling for communicating cool air, a primary coolant, or a secondary coolant with host 12.

It will further be appreciated that, while the embodiments in the drawings illustrate specific examples of mechanical power service communicating devices, such as a host 12 that may operate as a mechanical power service provider, an accessory device 14 that may operate as a mechanical power service consumer, and an adapter 16 that may act as a service pathway for the transfer of mechanical power service from host 12 to accessory device 18, variations from this configuration are possible. These variations include systems with only two mechanical power service communicating devices, systems with more than three mechanical power service communicating devices, systems where any of the devices may be mechanical power service consumers and/or mechanical power service providers, systems where multiple services, including, for example electrical power and data, are communicated, and systems where services are received by one device, converted in some manner, and then passed to a third device. Furthermore, in the following description, certain components of connector systems and proximity systems are described for the illustrative purposes as being associated with specific mechanical power service communicating devices. For example, a proximity switch, target or sensor may be described as being located in a mechanical power service provider, mechanical power service consumer, host, or accessory device. It will be appreciated that these system components may be alternatively assigned to the various mechanical power service communicating devices depending on the application.

Host 12 and accessory device 14 may each comprise at least one mechanical power service connector component, respectively referred to herein as a host mechanical power service connector component 20 and a device mechanical power service connector component 22. Host mechanical power service connector component 20 and device mechanical power service connector component 22 have complementary configurations that enable the mechanical power service connector components to be coupled to one another, thereby establishing a mechanical power service pathway over which desired mechanical power services can be transferred between host 12 and accessory device 14.

Host 12 also has a second host mechanical power service connector 20 provided on its front surface for a first device mechanical power service connector 22 provided on the adapter 16. In instances where accessory device 18 includes an incompatible mechanical power service connector component 21, and the adapter 16 is used as an intermediate component to connect accessory device 18 to host 12, adapter 16 may include a second device mechanical power service connector component 23 for engagement with the device mechanical power service connector component 21 of accessory device 18, as well as the first device mechanical power service connector component 22 for connection with the host mechanical power service connector component 20 of host 12. Therefore, device mechanical power service connector components 22 may have the same general configuration whether included as part of accessory device 14 or as a part of adapter 16, and mechanical power service connectors 20 may have the same general configuration whether it couples directly with accessory device 14 or adapter 16. Accordingly, for purposes of discussion, the various features and operation of the mechanical power service connector components will hereinafter be described in connection with host 12 or accessory device 14, but it shall be appreciated that the mechanical power service connector components may also be used in conjunction with adapter 16 or directly with accessory device 18.

Figure 4:
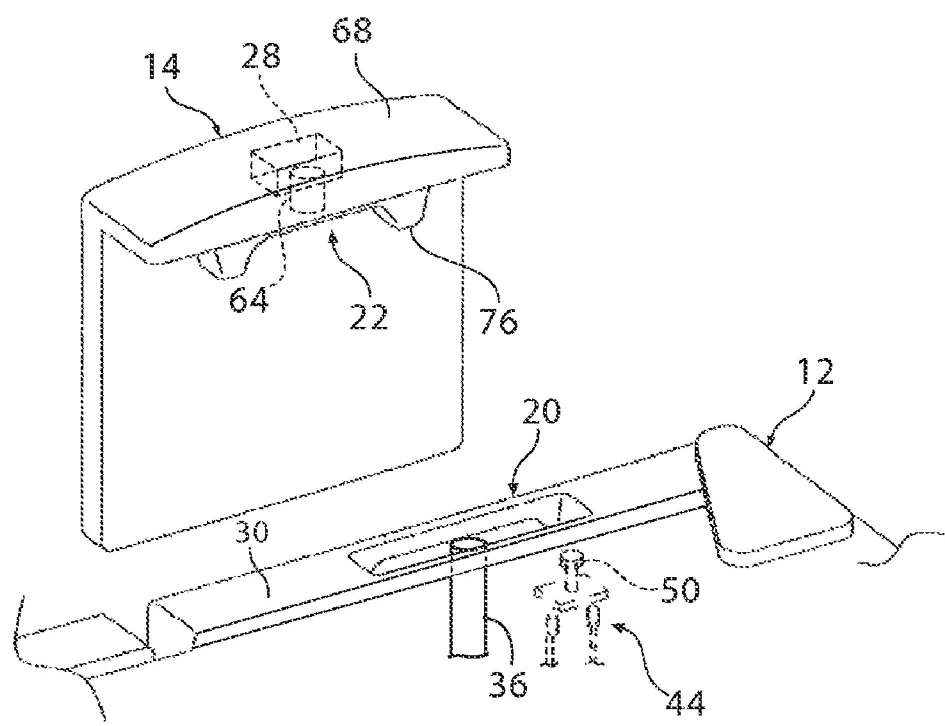
FIG. 4 is a partial top rear perspective view of the modular system of FIG. 1 with the accessory device removed from the host, showing a host portion of the mechanical power coupling system.
Figure 5:
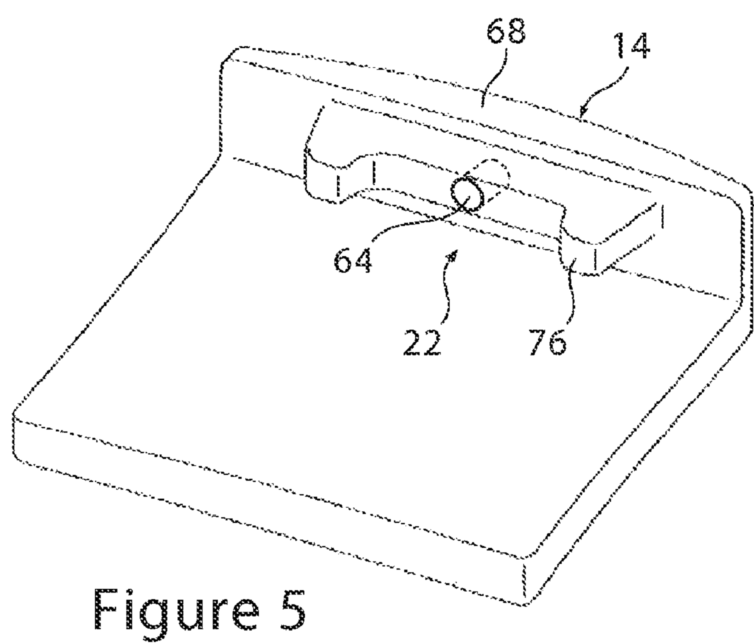
FIG. 5 is a bottom perspective view of the accessory device of FIG. 1, showing an accessory device portion of the mechanical power coupling system.

Referring to FIGS. 4 and 5, host mechanical power service connector component 20 can be integrally formed with host 12 or may be an add-on device. Host mechanical power service connector component 20 may be enclosed within a housing 30 of the host 12. Housing 30 may be an integral part of host 12 or may be a separate component. For purposes of discussion, housing 30 is illustrated as an integral part of host 12, and more particularly as part of the door of a refrigerator. When configured as an add-on device, host mechanical power service connector component 20 may also function as an adapter to enable a host and an accessory device having dissimilar mechanical power service connector components to be indirectly coupled to one another. Host mechanical power service connector component 20 may be removable or non-removable from host 12. Host mechanical power service connector component 20 can be configured to transfer or receive a single mechanical power service or multiple mechanical power services.

Device mechanical power service connector component 22 can be integrally formed with accessory device 14 or may be an add-on component. For purposes of discussion, device mechanical power service connector component 22 is shown integrally formed with accessory device 14. When configured as an add-on component, device mechanical power service connector component 22 may also function as an adapter to enable a host and an accessory device having dissimilar mechanical power service connector components to be indirectly coupled to one another. Device mechanical power service connector component 22 may be removable or non-removable from accessory device 14. Device mechanical power service connector component 22 can be configured to transfer or receive a single mechanical power service or multiple mechanical power services.

Device mechanical power connector component 22 may be enclosed within a housing 68 of accessory device 14. Housing 68 may be an integral part of accessory device 14 or may be a separate component. For purposes of discussion, housing 68 is illustrated as an integral part of accessory device 14.

Figure 6:
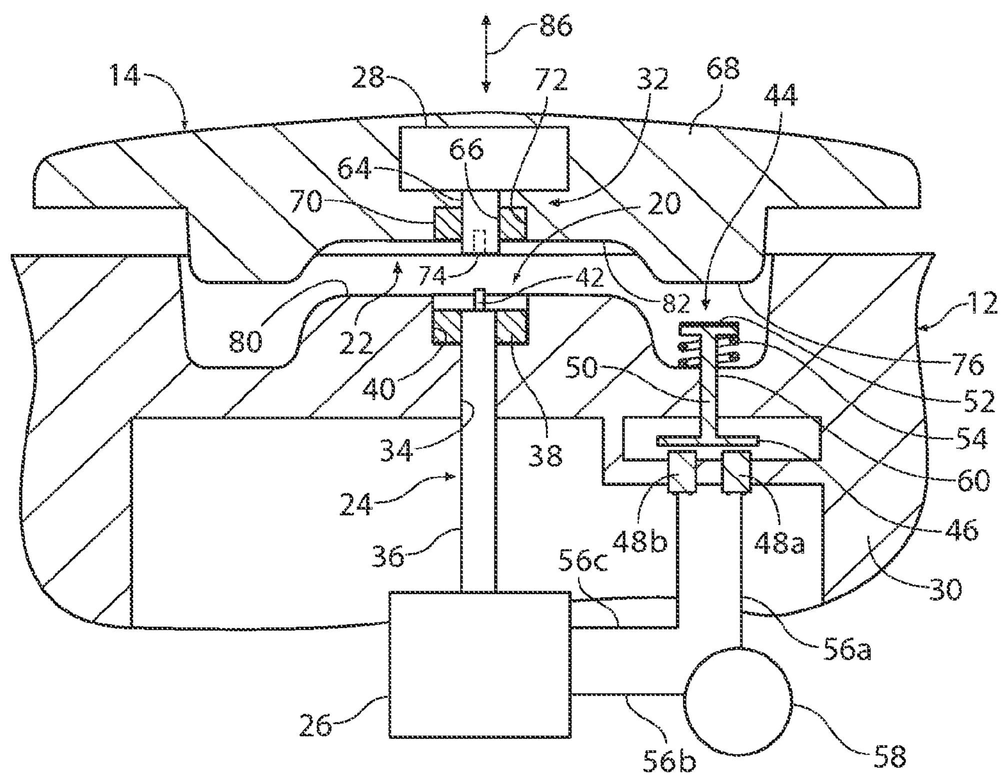
FIG. 6 is a partial cross-sectional view of the modular system of FIG. 1, showing the accessory device portion of the mechanical power coupling system positioned for engagement with the host portion of the mechanical power coupling system.
Figure 7:
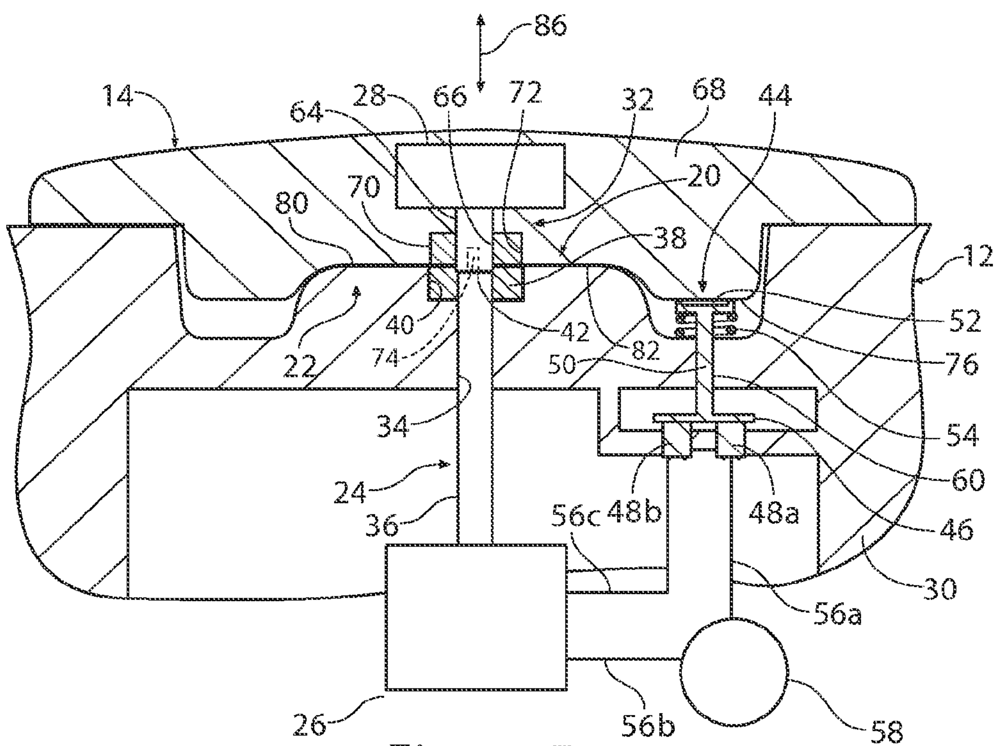
FIG. 7 is a partial cross-sectional view similar to FIG. 6, showing the device portion of the mechanical power coupling system engaged with the host portion of the mechanical power coupling system.

Referring to FIGS. 6 and 7, host 12 may be associated with a mechanical power service provider 26 for selectively providing a mechanical power service via a mechanical service pathway 24 to host mechanical power service connector component 20 for delivery to device mechanical power service connector component 22. Accessory device 14 may similarly be provided with a mechanical power service consumer 28 capable of receiving, via a mechanical power service pathway 32, the mechanical power service delivered to device mechanical power service connector component 22, and using the mechanical power.

It will be appreciated that, in addition to providing pathways and interfaces for mechanical power service, accessory device 14 and host 12 may be configured to provide additional service communication features, not shown, for communicating other services such as one or more electrical contacts connected by electrical wires to an electrical power consumer or provider. As further examples, they may have fiber optic interfaces, or complimentary substance communication couplings.

Host mechanical power service pathway 24 is operably connected to mechanical power service provider 26 and is operable for communicating a mechanical power service from mechanical power service provider 26 for delivery to accessory device 14. In the structure shown in FIGS. 6 and 7, mechanical power service provider 26 may be a motor disposed with the housing 30 of host 12 and providing rotational movement as an output. First host mechanical power service pathway 24 may be a shaft 36 having a distal end operably connected to the mechanical power service provider 26 and receiving rotational mechanical power therefrom, and intermediate portion extending through a passageway 34 in housing 30 and through a bearing 38 disposed in an enlarged bore 40 in the outer face of housing 30. The proximal end of shaft 36 is provided with a coupling feature, such as a male keyed end 42.

For purposes of discussion, mechanical power service pathways 24 and 32 are described and illustrated generically as rotating shafts. Alternative configurations may be used, such as translating belts cable or chains, with the choice depending on, at least in part, the type of mechanical power service required, the footprint of the devices involved, and manufacturing considerations.

Host mechanical power connector component 20 may include a mechanical power service switch 44 responsive to the coupling of accessory device 14 to host 12 to regulate the delivery of mechanical power to host mechanical power service pathway 24. It should be understood that various mechanical power service switches may be used to control mechanical power service communication through service pathway 24. The type of mechanical power service switch may be designed to fail in a non-power communicating condition, such as a normally open electromechanical switch.

Service switch 44 may be a mechanical contact proximity switch that may be selectively actuated to provide power or to provide a control signal to mechanical service provider 26. Service switch 44 may include a switch plate 46 that is movable between an open position (see FIG. 6) and closed position (see FIG. 7) against contacts 48*a* and 48*b* to enable electrical power or data to be selectively provided to mechanical service provider 26.

More particularly, switch plate 46 may be controlled by a mechanically actuated plunger 50. One end of plunger 50 may be operably connected to switch plate 46 and an opposite end extends out from housing 30 and forms a proximity sensor 52 that is engageable with a proximity target, described below, associated with accessory device 14.

Depressing plunger 50 causes switch plate 46 to be displaced toward and into engagement with first and second contacts 48*a* and 48*b*, thereby closing an electrical path therebetween. A biasing member 54 may be provided urging switch plate 46 away from first and second contacts 48*a* and 48*b* when the proximity target is not detected by proximity sensor 52. Thus, service switch 44 is generally disposed in the open position when accessory device 14 is decoupled from host 12. Plunger 50 may include a proximity sensor 52 adapted to activate switch 44 upon engaging an appropriate proximity target, described shortly, provided with accessory device 14. Plunger 50 slidably engages an aperture 60 in housing 30.

Electrical lines 56*a*, 56*b*, and 56*c* respectively connect a first side of an electromagnetic service provider 58 with contact 48*a*, a second side of electromagnetic service provider 58 with a contact for mechanical power service provider 26, and contact 48*b* with another contact for mechanical power service provider 26. Electromagnetic service provider 58 therefore provides power for operating mechanical power service provider 26 or, alternatively, a control signal for regulating the operation of mechanical power service provider 26 in response to the closing of service switch 44.

Service switch 44 may have any of a variety of alternative configurations depending on the requirements of the particular application. Service switch 44 may be configured to selectively transfer an appropriate control signal for controlling mechanical power service provider 26 in response to proximity sensor 52 detecting the presence of a proximity target associated with accessory device 14. The control signal may include an electrical signal, an acoustic or electromagnetic wave, a pneumatic signal, an optical signal, a magnetic flux signal, a radio frequency signal, an infrared (IR) signal, a hydraulic signal, a physical displacement of a linking member, as well as others. In such applications, electromagnetic service provider 58 may be any signal source, such as a source of electrical power, pressurized air, water or other fluid, acoustical data, or other data source and lines 56*a*, 56*b*, and 56*c* may be any service pathway type appropriate for such signal source. In such applications, service switch 44 would substitute an appropriate switch type, such as a switch comprising a substance line of compressed fluid is used for carrying the signal.

As mentioned above, mechanical power service consumer 28 associated with accessory device 14 may be operably connected to an accessory device mechanical power service pathway 32. In the structure illustrated, mechanical power service consumer 28 is a device using or transferring rotational mechanical power. Mechanical power service pathway 32 may be a shaft 64 having a distal end connected to an input of mechanical power service consumer 28, an intermediate portion extending through a passageway 66 in housing 68, and a proximal end provided with a coupling feature, such as a female keyed end 74. A bearing 70 is provided on the shaft 64 and is disposed in a large bore 72 in the outer face of housing 68. The female keyed end 74 is engageable with male keyed end 42 of shaft 36 associated with host 12 to selectively permit shaft 36 to engage with and drive shaft 64 when accessory device 14 is coupled to host 12. Accessory device 14 may further be provided with a biasing member, not illustrated, for biasing shaft 64 into engagement with drive shaft 36 and to accommodate any tolerance accumulation between components.

Accessory device 14 may further be provided with a proximity target 76 designed for cooperation with the proximity sensor 52. As illustrated herein, proximity target 76 is a portion of housing 68 configured to contact proximity sensor 52 when accessory device 14 is coupled to host 12.

Proximity sensor 52 and proximity target 76 may together form a proximity switch for determining whether the host 12 and accessory device 14 are in proximity with each other. The proximity switch may be operably connected to the service switch 44 by a link that transmits movement of the proximity switch to the service switch 44. As illustrated herein, the link comprises the plunger 50.

Similar to host mechanical power service pathway 24, accessory device mechanical power service pathway 32 is also illustrated and described as a rotating shaft. There are a variety of potentially different configurations that may vary depending on the type of mechanical power service being transferred, as well as other design considerations. In practice, the actual configuration may vary depending on, at least in part, the type of mechanical power service being transferred, packaging requirements, and manufacturing considerations.

Host mechanical power service connector component 20 and device mechanical power service connector component 22 may include various features to facilitate coupling of accessory device 14 to host 12. For example, host mechanical power service connector component 20 may include a raised boss 80 that can engage a corresponding recess 82 of device mechanical power service connector component 22. Alignment features such as boss 80 and recess 82 may assist in positioning device mechanical power service connector component 22 relative to host mechanical power service connector component 20 prior to engagement, and may also function to minimizing lateral movement of accessory device 14 relative to host 12 when device mechanical power service connector component 22 is coupled to host mechanical power service connector component 20. It shall be appreciated, however, that the illustrated configuration is merely one example of the type of features that may be incorporated into host mechanical power service connector component 20 and device mechanical power service connector component 22 to aide alignment and coupling of accessory device 14 to host 12. In practice, other configurations may also be employed to accommodate various design considerations of a particular application.

The process of coupling and decoupling accessory device 14 with host 12 will now be described. Coupling of accessory device 14 to host 12 can be accomplished by positioning accessory device 14 adjacent host 12 in such a manner that device mechanical power service connector component 22 is generally aligned with host mechanical power service connector component 20, as shown in FIG. 6. Device mechanical power service connector component 22 and host mechanical power service connector component 20 can be coupled together by generally moving accessory device 14 toward host 12 along a path indicated by arrow 86 until the two members are fully seated, as shown in FIG. 7. With device mechanical power service connector component 22 fully engaging host mechanical power service connector component 20, keyed end 74 of shaft 64 operably engages keyed end 42 of shaft 36. The process of coupling device mechanical power service connector component 22 to host mechanical power service connector component 20 causes proximity target 76 to engage proximity sensor 52 of service switch 44, which depresses plunger 50 so as to engage switch plate 46 with first and second contacts 48*a* and 48*b*. Depressing service switch 44 operably completes a circuit, allowing power or a control signal to be transmitted from electromagnetic service provider 58 to mechanical power service provider 26.

It should be noted that mechanical power service switch 44 is intended to selectively permit and inhibit communication of mechanical power service from the mechanical power service supply to the shaft 36 of the host mechanical power service connector component 20 based on the detection of the proximity target 76 by the proximity sensor 52, and that other switches, sensors and controls may be provided to further regulate the control of mechanical power service based on the needs of the user of the accessory device.

Accessory device 14 may be decoupled from host 12 by reversing the previously described process for coupling the two. Disengaging device mechanical power service connector component 22 from host mechanical power service connector component 20 releases plunger 50 and disengages switch plate 46 from first and second contacts 48*a* and 48*b*, thereby interrupting the communication of mechanical power service between accessory device 14 and host 12.

Referring to FIGS. 8 through 14, alternative mechanical power coupling systems, each having mechanical power service coupling components for an accessory device and a host according to further embodiments of the invention are schematically illustrated. It will be appreciated that coupling components will vary depending upon the type of mechanical power service being transferred and the loads involved.

Figure 8:
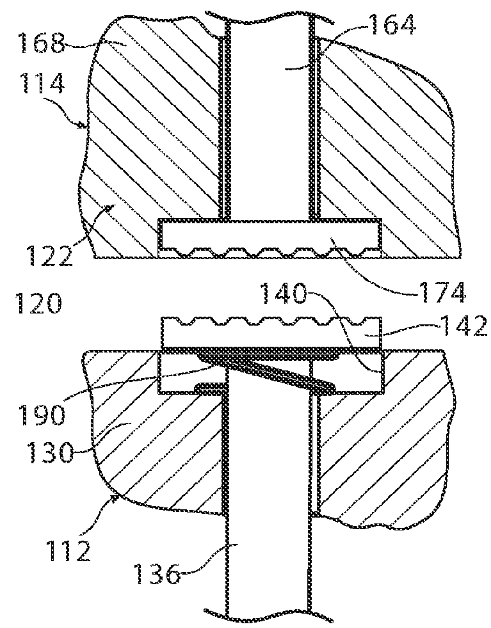
FIGS. 8 and 9 are enlarged views of a portion of a mechanically energized mechanical power coupling system according to a second embodiment of the invention having connector components for communicating power between an accessory device and a host, shown respectively in a disengaged and an engaged condition.
Figure 9:
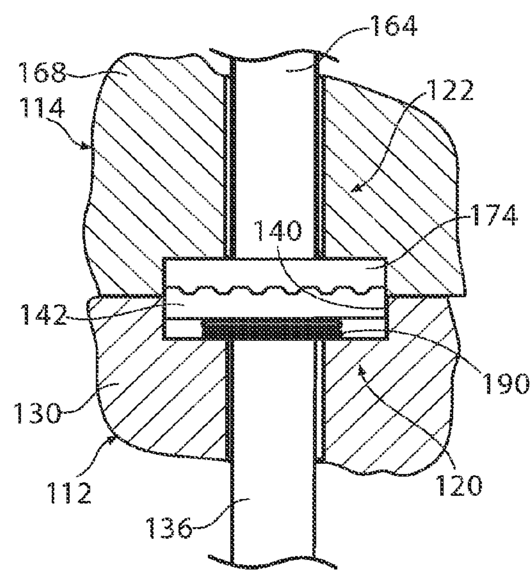

As illustrated in FIGS. 8 and 9, a mechanical power coupling system according to a second embodiment of the invention comprises a host 112 having a housing 130 and an accessory device 114 having a housing 168 that may transfer power between respective mechanical power service connector components 120 and 122. The connector components 120 and 122 respectively comprise shafts 136 and 164 having toothed clutch plates 142 and 174 formed on the respective proximate ends of shafts 136 and 164. Toothed clutch plates 142 and 174 function similarly to the keyed ends 42 and 74 of shafts 36 and 64, described above with reference to FIGS. 6 and 7, except that their large interengaged surface areas permit the toothed clutch plates 142 and 174 to communicate more torque and accommodate more shock than the keyed ends. A biasing member, such as a spring 190, may be provided in an enlarged bore 140 in at least one housing 130 or 168 to bias one of the toothed clutch plates 142 and 174 into engagement with the other toothed clutch plate to provide a reliable connection while accommodating tolerance accumulation and vibration.

Figure 10:
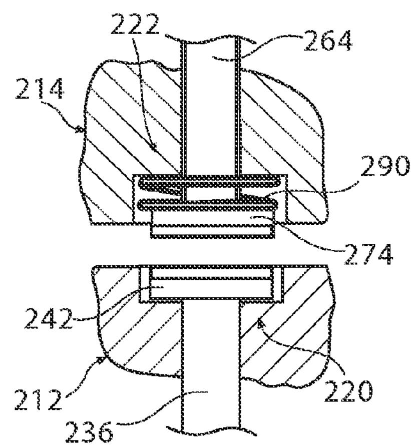
FIGS. 10 and 11 are enlarged views of a portion of a mechanically energized mechanical power coupling system according to a third embodiment of the invention having connector components for communicating power between an accessory device and a host, shown respectively in a disengaged and an engaged condition.
Figure 11:
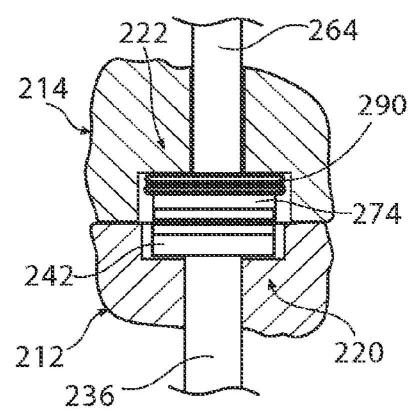

As illustrated in FIGS. 10 and 11, a mechanical power coupling system according to a third embodiment of the invention comprises a host 212 and an accessory device 214 that may transfer power between respective mechanical power service connector components 220 and 222. The connector components 220 and 222 respectively comprising shafts 236 and 264 having flat clutch plates 242 and 274 formed on the respective proximate ends of shafts 236 and 264. Flat clutch plates 242 and 274 function similarly to the toothed clutch plates 142 and 174, described above with reference to FIGS. 8 and 9, except that they use rough surfaces rather than teeth for inter-engagement. The rough surface permits some slippage between the plates, which may be desirable for some applications. Furthermore, they are not as sensitive to initial alignment of the plates as are the toothed clutch plates 142 and 174, described above. A biasing member, such as a spring 290, may be provided to bias one of the flat clutch plates 242 and 274 into engagement with the other flat clutch plate to provide a reliable connection while accommodating tolerance accumulation and vibration.

Figure 12:
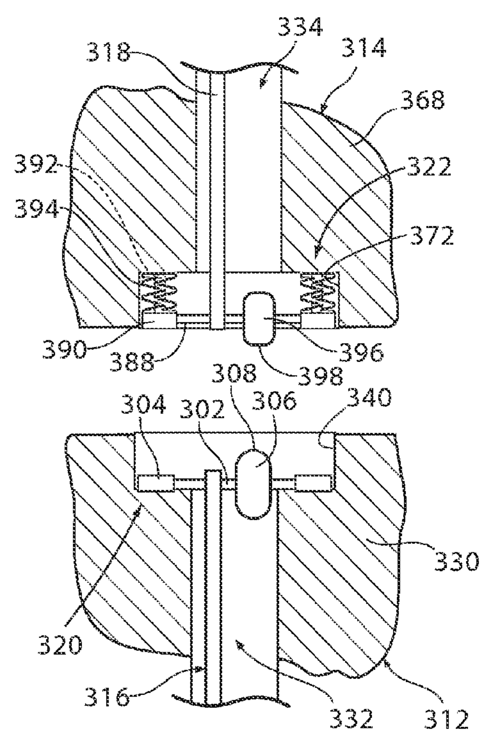
FIGS. 12 and 13 are enlarged views of a portion of a mechanically energized mechanical power coupling system according to a fourth embodiment of the invention having connector components for communicating power between an accessory device and a host, shown respectively in a disengaged and an engaged condition.
Figure 13:
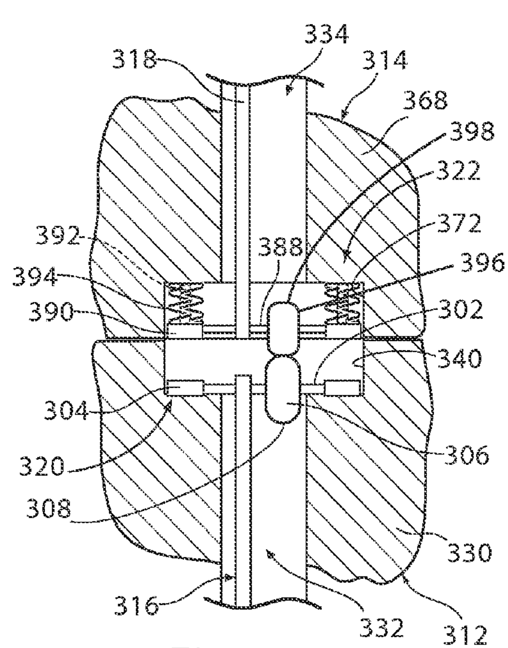
Figure 14:
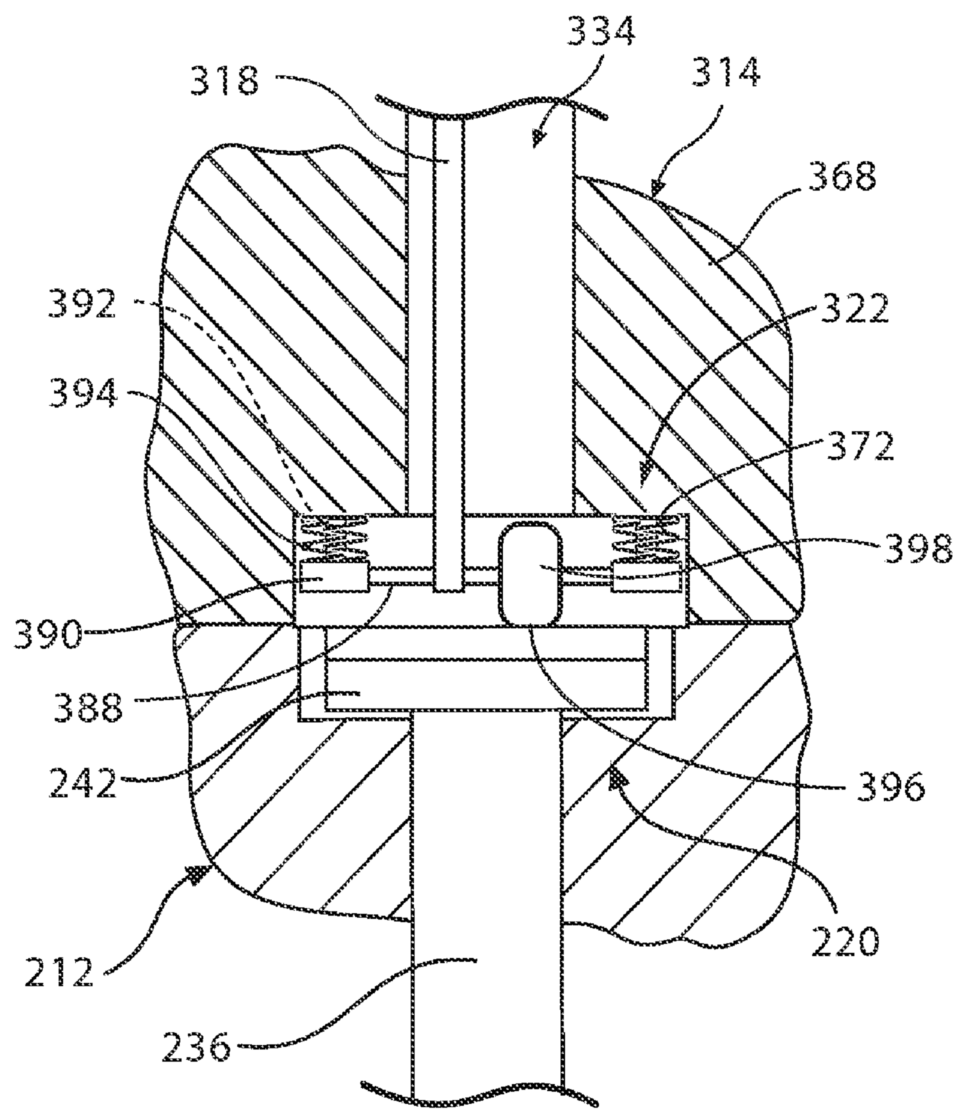
FIG. 14 is an enlarged view of a portion of a mechanically energized mechanical power coupling system according to a fifth embodiment of the invention having connector components for communicating power between an accessory device and a host, shown respectively in a disengaged and an engaged condition.

As mentioned above, it is contemplated that mechanical power may be communicated using means other than rotating shafts. FIGS. 12, 13 and 14 illustrate coupling systems where power is at least partially communicated using a translating belt.

As illustrated in FIGS. 12 and 13, a mechanical power coupling system according to a fourth embodiment of the invention comprises a host 312 having a housing 330 and an accessory device 314 having a housing 368 that may transfer power between respective mechanical power service connector components 320 and 322. Host 12 may communicate mechanical power from a mechanical power source, not shown, by way of a mechanical service pathway 332 comprising a translating belt 316 having a portion extended about a shaft 302 disposed in a bore 340 in housing 330. Belt 316 may have a grooved surface, not shown, engaging a similarly grooved surface on the exterior of the shaft. It will be apparent that, as desired for certain applications, a cable and pulley or a chain and gear system may be substituted for the belt and grooved surface system described. Shaft 302 is rotatably mounted at each end to housing 330, such as by supports 304 mounted to the base of bore 340. A wheel 306 having a circumferentially disposed engagement surface 308, such as a frictional surface or gear teeth, is fixedly secured to shaft 302 for rotation therewith.

Accessory device 314 may similarly communicate mechanical power to a mechanical power consumer, not shown, by way of a mechanical service pathway 334 comprising a translating belt 318 having a portion extended about a shaft 388 disposed in a bore 372 in housing 368. Shaft 388 is rotatably mounted at each end to housing 368, such as by supports 390, which are, in turn, slidably supported on one or more pin(s) 392 mounted to the base of bore 372. A biasing member, such as a spring 394, may surround each pin 392 and bias shaft 388 away from the base of bore 372 against a stop, not shown, provided on pins 392 to limit the movement of the shaft 388. A wheel 396 having a circumferentially disposed engagement surface 398, such as a frictional surface or gear teeth, is fixedly secured to shaft 388 for rotation therewith.

When accessory device 314 is coupled with host 312, the respective engagement surfaces 308 and 398 of wheels 306 and 396 engage to permit the communication of power therebetween. Springs 394 maintain a reliable coupling between wheels 306 and 396 and accommodate a tolerance accumulation and vibration between accessory device 314 and host 312.

As mentioned above, it is contemplated that mechanical power may be communicated between devices using dissimilar types of mechanical power. In some cases, power may be transmitted using one type of power and then converted, such as by an adapter, to a different type of mechanical power. It is also contemplated that some conversion may occur at the coupling between a host and an accessory device.

FIG. 14 schematically illustrates a mechanical power coupling system according to a fifth embodiment of the invention, wherein one of the connector components uses a rotating shaft while the other connector component uses a translating belt. For example, host 212 of FIGS. 10 and 11 may be coupled to accessory device 314 of FIGS. 12 and 13, with engagement surface 398 of wheel 396 engaging the flat clutch plate 242 to communicate power therebetween.

It will be appreciated that still further variations are possible. For example, flat clutch plate 242 may be replaced with a beveled gear and wheel 396 may have a complementary beveled gear. Alternatively, wheel 396 may be keyed to shaft 388 and be selectively displaceable along shaft 388 to provide a variable transmission between the components at the coupling.

Figure 15:
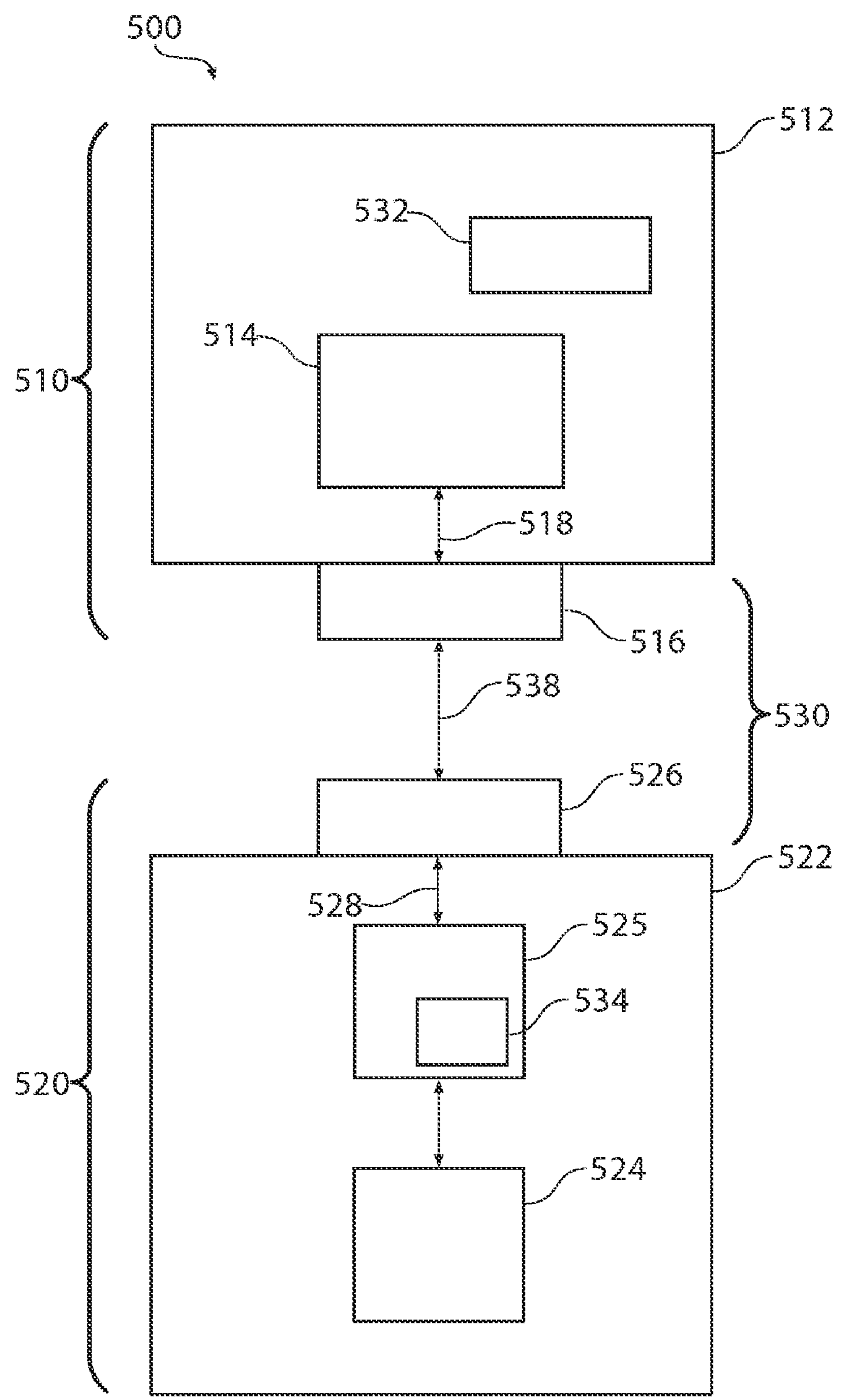
FIG. 15 is a schematic illustration of a mechanical power service supply and consumption system.

With reference to FIG. 15, a more general example of a mechanical power service supply and consumption system 500 is schematically illustrated. A first subsystem 510 is connectable to a second subsystem 520 for selectively transferring a mechanical power service between subsystems 510 and 520. As illustrated, first subsystem 510 may include an accessory device 512, such as a portable electronic device, including a mechanical power service consumer 514 connected to a first mechanical power service connector component, such as a plug 516, by means of a mechanical power service pathway 518. Second subsystem 520 may include a host 522, such as a refrigerator, including a mechanical power service provider 524 connected to a second mechanical power service connector component, such as a receptacle 526, through a mechanical power service switch 525 by mechanical power service pathway 528.

A connector system 530 includes plug 516 and receptacle 526, which are selectively interengageable. A proximity target 532 and a service switch 534, which includes a proximity sensor for detecting the presence of proximity target 532, are respectively associated with first subsystem 510 and second subsystem 520, respectively. Service switch 534 is operable to selectively activate mechanical power service switch 525 when plug 516 and receptacle 526 are engaged, as determined by the proximity sensor, to permit the communication of the mechanical power service from mechanical power service provider 524 to the receptacle 526, then along a mechanical power service communication service pathway 538 between receptacle 526 and plug 516, and then along mechanical power service pathway 518 to mechanical power service consumer 514.

It will be appreciated that while host 522 is illustrated as including a mechanical power service provider and accessory device 512 is illustrated as including a mechanical power service consumer, accessory device 512 may alternatively or additionally include a mechanical power service provider and host 522 may alternatively or additionally include a mechanical power service consumer. It will further be appreciated that while plug 516 is illustrated as being associated with mechanical power service consumer 514 and receptacle 526 is illustrated as being associated with mechanical power service provider 524, it is contemplated that plug 516 and receptacle 518 may be male or female connector components so long as the components are capable of interengaging to permit the transfer of mechanical power service therebetween.

With regard to the processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

It is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In summary, it should be understood that the invention is capable of modification and variation and is limited only by the following claims.

All defined terms used in the claims are intended to be given their broadest reasonable constructions consistent with the definitions provided herein. All undefined terms used in the claims are intended to be given their broadest reasonable constructions consistent with their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

What is claimed is:

1. A system for receiving a mechanical power service consumer comprising:

a mechanical power coupling system comprising:

a first mechanical power service connector component capable of being operably associated with the mechanical power service consumer;

a contact proximity target associated with at least one of the first mechanical power service connector and the mechanical power service consumer;

a second mechanical power service connector component operably engageable with the first mechanical power service connector component, the second mechanical power service connector component being capable of being operably associated with a mechanical power service source;

a mechanical power service switch operably associated with the second mechanical power service connector component, the mechanical power service switch selectively permitting the communication of the mechanical power service from the mechanical power service source to the first mechanical power service connector component; and a contact proximity sensor operably associated with the mechanical power service switch, the contact proximity sensor engageable with the contact proximity target when the first mechanical power service connector component is engaged with the second mechanical power service connector component;

wherein the mechanical power service switch is operable to permit communication of the mechanical power service to the first mechanical power service connector component in response to the contact proximity sensor engaging the contact proximity target.

2. The system according to claim 1, wherein the mechanical power service switch and the contact proximity sensor are integrated into a common unit.

3. The system according to claim 1, wherein the contact proximity sensor transmits a signal to the mechanical power service switch indicating that the first mechanical power service connector component is engaged with the second mechanical power service connector component.

4. The system according to claim 3, wherein the mechanical power service switch permits communication of the mechanical power service through the first mechanical power service connector component in response to the signal received from the contact proximity sensor.

5. The system according to claim 3, wherein the signal includes at least one of an electrical signal, a pneumatic signal, an optical signal, a magnetic flux signal, a radio frequency signal, an infrared signal, a hydraulic signal, and physical displacement.

6. The system according to claim 1, wherein the contact proximity sensor comprises a contact proximity switch moveable between a first position when the first mechanical power service connector component is disengaged from the second mechanical power service connector component, and a second position when the first mechanical power service connector component is engaged with the second mechanical power service connector component, the mechanical power service switch responding to movement of the contact proximity switch.

7. The system according to claim 6, wherein the contact proximity switch is biased to the first position when the first mechanical power service connector component is disengaged from the second mechanical power service connector component.

8. The system according to claim 7 and further comprising a link connecting the contact proximity switch to the mechanical power service switch, wherein movement of the contact proximity switch is transmitted through the link to the mechanical power service switch.

9. The system according to claim 6, wherein the contact proximity target pushes the contact proximity sensor into the second position.

10. The system according to claim 1, wherein the second mechanical power service connector is provided on a host, and the host comprises at least one of a refrigerator, a freezer, a conventional oven, a microwave oven, a dishwashing machine, a stove, a range, an air conditioner, a dehumidifier, a clothes washing machine, a clothes dryer, a clothes refreshing machine, a non-aqueous washing apparatus, a water softener, a water heater, a furnace, pool water treatment equipment, an HVAC system, a thermostat, a blender, a mixer, a toaster, a coffee maker, a trash compactor, an air purifier, an iron, a vacuum cleaner, a robot, and a structural feature of a building.

11. The system according to claim 1 and further comprising an accessory device comprising the mechanical power service consumer.

12. The system according to claim 10 and further comprising an accessory device comprising the mechanical power service consumer.

13. The system according to claim 1, wherein the first and second mechanical power service connector components each comprise at least one of a flat clutch plate, a toothed clutch plate, a wheel, a gear and a keyed coupling component.

14. A mechanical power coupling system for connecting a portable device to a host, the mechanical power coupling system comprising:

a mechanical power service connector component capable of communicating a mechanical power service;

a mechanical power service switch operably connected to the mechanical power service connector component for selectively permitting the mechanical power service to be transmitted to the mechanical power service connector component; and a contact proximity sensor operably connected to the mechanical power service switch and engageable with a contact proximity target;

wherein the mechanical power service switch is configured to allow the mechanical power service to be transmitted to the mechanical power service connector component when the contact proximity sensor engages the contact proximity target.

15. The system according to claim 14, wherein the mechanical power service switch and the contact proximity sensor are integrated into a common unit.

16. The system according to claim 14 and further comprising a mechanical power service source operably connected to the mechanical power service switch for supplying the mechanical power service.

17. The system according to claim 14, wherein the contact proximity sensor transmits a signal to the mechanical power service switch indicating that the contact proximity sensor is engaging the contact proximity target.

18. The system according to claim 17, wherein the mechanical power service switch permits communication of the mechanical power service to the mechanical power service connector component in response to the signal received from the contact proximity sensor.

19. The system according to claim 17, wherein the signal includes at least one of an electrical signal, a pneumatic signal, an optical signal, a magnetic flux signal, a radio frequency signal, an infrared signal, a hydraulic signal, and physical displacement.

20. The system according to claim 14, wherein the contact proximity sensor comprises a contact proximity switch moveable between a first position when the contact proximity sensor is disengaged from the contact proximity target, and a second position when the contact proximity sensor is engaged with the contact proximity target, the mechanical power service switch responding to movement of the contact proximity switch.

21. The system according to claim 20, wherein the contact proximity switch is biased to the first position when the contact proximity sensor is disengaged from the contact proximity target.

22. The system according to claim 21, wherein the contact proximity target pushes the contact proximity sensor into the first position.

23. The system according to claim 21 and further comprising a link connecting the contact proximity switch to the mechanical power service switch, wherein movement of the contact proximity switch is transmitted through the link to the mechanical power service switch.

24. The system according to claim 14, wherein the host comprises at least one of a refrigerator, a freezer, a conventional oven, a microwave oven, a dishwashing machine, a stove, a range, an air conditioner, a dehumidifier, a clothes washing machine, a clothes dryer, a clothes refreshing machine, a non-aqueous washing apparatus, a water softener, a water heater, a furnace, pool water treatment equipment, an HVAC system, a thermostat, a blender, a mixer, a trash compactor, an air purifier, an iron, a vacuum cleaner, a robot, and a structural feature of a building.

25. A system for use in association with a host having a mechanical power service provider, a first mechanical power service connector component, and a mechanical power service switch selectively providing a mechanical power service to the first mechanical power service connector component in response to a contact proximity sensor engaging a contact proximity target, and in association with an accessory device having a mechanical power service consumer, the system comprising:

a second mechanical power service connector component engageable with the first mechanical power service connector component;

a mechanical power service pathway interconnecting the mechanical power service consumer and the second mechanical power service connector component; and a contact proximity target capable of engaging the contact proximity sensor to activate the mechanical power service switch.

26. The system according to claim 25, wherein the system further comprises the mechanical power service consumer.

27. The system according to claim 26 and further comprising a housing, wherein the mechanical power service consumer, the mechanical power service pathway and the contact proximity target are each at least partially disposed within the housing.

28. The system according to claim 26 and further comprising an adapter, the mechanical power service consumer further comprising the accessory device which is capable of being removably coupled to the adapter.

29. The system according to claim 26, wherein the mechanical power service consumer is at least one of a smart utensil, an appliance, a resource controller, a dispenser, a detergent dispenser, a drink dispenser, a mixer, a fan, a blender, a cycle accessory, a water dispenser, a motor, a tissue dispenser, a can opener, an ice dispenser, an ice maker, an ice shaver, an ice crusher, an ice cream maker, a coffee maker, a coffee grinder, a drink mixer and stirrer, a slush maker, a milk shake maker, a juice squeezer, a food processor, an agitator, a food spit, and a food stirrer.

30. The system according to claim 26, wherein the mechanical power service consumer is portable.

31. The system according to claim 25, wherein the contact proximity target is engageable with the contact proximity sensor.

32. The system according to claim 25, wherein the second mechanical power service connector component comprises at least one of a gear, a flat clutch, a toothed clutch and a keyed coupling component.

33. An adapter for removably coupling a portable device having a first device mechanical power service connector component to a host having a mechanical power service provider, a first host mechanical power service connector component that cannot be directly connected to the first device mechanical power service connector component, and a mechanical power service switch selectively providing a mechanical power service to the first host mechanical power service connector component in response to a contact proximity sensor engaging a contact proximity target, the adapter comprising:

a second host mechanical power service connector component engageable with the first host mechanical power service connector component;

a second device mechanical power service connector component engageable with the first device mechanical power service connector component;

a mechanical power service pathway interconnecting the second host mechanical power service connector component and the second device mechanical power service connector component for the transfer of a mechanical power service therealong; and a contact proximity target capable of engaging the contact proximity sensor to actuate the mechanical power service switch.

34. The adapter according to claim 33, wherein the contact proximity target engages the contact proximity sensor to actuate the mechanical power service switch when the second host mechanical power service connector component engages the first host mechanical power service connector component associated with the host.

35. A mechanical power communication device for mechanical power communication with an appliance performing a useful cycle of operation on an article and having a housing, a cavity in the housing, the cavity having an first mechanical power service connector component, and a first proximity coupling system component associated with the first mechanical power service connector component, the mechanical power service communicating device comprising:

a second mechanical power service connector component capable of connecting with the first mechanical power service connector component for the communication of mechanical power service therebetween; and a second proximity coupling system component associated with the second mechanical power service connector component, capable of communicating with the first proximity coupling system component within a proximity coupling system to selectively control the communication of mechanical power service between the first and second mechanical power service connectors in response to the interaction of the proximity coupling devices providing an indication that the first and second mechanical power service connectors are coupled.

36. The mechanical power communication device according to claim 35, wherein the second proximity coupling system component comprises a proximity target.

37. The mechanical power communication device according to claim 36, wherein the proximity target comprises a contact proximity target.

38. The mechanical power communication device according to claim 35, wherein the second proximity coupling system component comprises a proximity sensor.

39. The mechanical power communication device according to claim 38, wherein the proximity sensor comprises a contact proximity sensor.

40. The mechanical power communication device according to claim 38 and further comprising a mechanical power service switch responsive to the detection of the first proximity coupling system component by the proximity sensor to selectively permit the communication of mechanical power service.

41. The mechanical power communication device according to claim 40, wherein the mechanical power service switch comprises at least one of an electrical switch, a mechanical valve, and a controller.

42. The mechanical power communication device according to claim 40, wherein the mechanical power service switch comprises a normally open electro-magnetically operated mechanical power service switch.

43. The mechanical power communication device according to claim 35, the second mechanical power service connector component comprises at least one of a gear, a flat clutch, a toothed clutch and a keyed coupling component.

44. The mechanical power communication device according to claim 35, wherein the mechanical power communication device comprises a mechanical power service consumer.

45. The mechanical power communication device according to claim 35, wherein the mechanical power communication device comprises a mechanical power service provider.

46. The mechanical power communication device according to claim 45, wherein the mechanical power service provider selectively provides a mechanical power service useful in the cycle of operation performed by the appliance on the article.

47. The mechanical power communication device according to claim 45, wherein the appliance performs the cycle of operation upon the mechanical power service provided by the mechanical power service provider.

48. The mechanical power communication device according to claim 45, wherein an article may be located in the cavity, and the cycle of operation is performed on the article within the cavity.

* * * * *

UNITED STATES PATENT AND TRADEMARK OFFICE

CERTIFICATE OF CORRECTION

PATENT NO. : 8,008,586 B2
APPLICATION NO. : 12/643226
DATED : August 30, 2011
INVENTOR(S) : Steven J. Kuehl et al.

It is certified that error appears in the above-identified patent and that said Letters Patent is hereby corrected as shown below:

Col. 22, lines 19 - 22, Claim 43: "The mechanical power communication device according to claim 35, the second mechanical power service connector component comprises at least one of a gear, a flat clutch, a toothed clutch and a keyed coupling component." should be Claim 43: -- The mechanical power communication device according to claim 35, wherein the second mechanical power service connector component comprises at least one of a gear, a flat clutch, a toothed clutch and a keyed coupling component. --

Signed and Sealed this
Sixteenth Day of October, 2012

David J. Kappos
*Director of the United States Patent and Trademark Office*